US009378194B2

(12) United States Patent
Steinmann et al.

(10) Patent No.: US 9,378,194 B2
(45) Date of Patent: Jun. 28, 2016

(54) PREVIEWING EMAIL TEMPLATES IN MARKETING CAMPAIGNS

(71) Applicants: Joerg Steinmann, Voelklingen (DE); Dirk Wagner, Marpingen (DE); Christoph Birkenhauer, Wiesloch (DE)

(72) Inventors: Joerg Steinmann, Voelklingen (DE); Dirk Wagner, Marpingen (DE); Christoph Birkenhauer, Wiesloch (DE)

(73) Assignee: SAP SE, Walldorf (DE)

( * ) Notice: Subject to any disclaimer, the term of this patent is extended or adjusted under 35 U.S.C. 154(b) by 403 days.

(21) Appl. No.: 14/066,677

(22) Filed: Oct. 29, 2013

(65) Prior Publication Data
US 2015/0121184 A1 Apr. 30, 2015

(51) Int. Cl.
| G06F 17/00 | (2006.01) |
| G06F 17/22 | (2006.01) |
| G06F 17/24 | (2006.01) |
| G06F 3/12 | (2006.01) |
| G06F 17/21 | (2006.01) |
| G06Q 10/10 | (2012.01) |
| G06Q 30/02 | (2012.01) |

(52) U.S. Cl.
CPC .......... *G06F 17/2247* (2013.01); *G06F 3/1257* (2013.01); *G06F 17/212* (2013.01); *G06F 17/22* (2013.01); *G06F 17/243* (2013.01); *G06F 17/248* (2013.01); *G06Q 10/107* (2013.01); *G06Q 30/02* (2013.01)

(58) Field of Classification Search
CPC ...... G06F 17/22; G06F 17/243; G06F 17/248
USPC .................. 715/205, 234; 709/203
See application file for complete search history.

(56) References Cited

U.S. PATENT DOCUMENTS

| 7,320,007 | B1 * | 1/2008 | Chang | G06F 17/248 707/694 |
| 7,568,152 | B1 * | 7/2009 | Wason | G06F 17/271 715/200 |
| 7,865,394 | B1 * | 1/2011 | Calloway | G06Q 10/107 370/252 |
| 7,890,851 | B1 * | 2/2011 | Milton, Jr. | G06F 17/248 705/310 |
| 8,037,408 | B2 * | 10/2011 | Hartmann | G06F 17/2247 715/237 |
| 8,346,803 | B2 * | 1/2013 | Chang | G06F 17/248 707/779 |
| 9,063,921 | B1 * | 6/2015 | Cogan | G06F 17/248 |
| 2002/0078158 | A1 * | 6/2002 | Brown | H04L 12/583 709/206 |
| 2005/0278625 | A1 * | 12/2005 | Wessling | G06F 17/248 715/273 |
| 2007/0277099 | A1 * | 11/2007 | Nakayama | G06F 17/243 715/234 |
| 2008/0178073 | A1 * | 7/2008 | Gao | G06F 17/24 715/243 |
| 2008/0243897 | A1 * | 10/2008 | Petri | G06F 17/248 |
| 2009/0089654 | A1 * | 4/2009 | Wittig | G06Q 10/107 715/223 |
| 2011/0149310 | A1 * | 6/2011 | Sekhon | G06F 3/1208 358/1.9 |

(Continued)

*Primary Examiner* — Mohammed-Ibrahim Zuberi (57) ABSTRACT

Various embodiments of systems and methods for customizing a preview content of an email template assigned to a marketing campaign are described herein. The method involves receiving a request to preview an email template. In response, a content of the email template including placeholders is invoked and the HyperText markup language (HTML) elements for the placeholders is identified. Further, descriptive names for the identified HTML elements are derived according to a correspondence language of the user. In an aspect, the correspondence language of the user is determined based on the user's language selection at the time of login. The identified HTML elements in the email template are replaced with the selected descriptive names and the preview content is rendered on an output interface.

18 Claims, 8 Drawing Sheets

(56) References Cited

U.S. PATENT DOCUMENTS

| | | | | |
|---|---|---|---|---|
| 2012/0179677 A1* | 7/2012 | Roselli | | G06Q 10/10 707/736 |
| 2013/0290149 A1* | 10/2013 | Rashwan | | G06Q 30/0641 705/27.1 |
| 2014/0229270 A1* | 8/2014 | Rashwan | | G06Q 30/0641 705/14.43 |
| 2014/0279016 A1* | 9/2014 | Capel | | G06Q 30/0261 705/14.58 |
| 2014/0281940 A1* | 9/2014 | Cogan | | G06F 17/24 715/256 |
| 2014/0330915 A1* | 11/2014 | Murphy | | H04L 51/063 709/206 |
| 2015/0143209 A1* | 5/2015 | Sudai | | G06F 17/248 715/202 |

* cited by examiner

CAMPAIGN: TRADE SHOW

[EXECUTE] [SAVE] [CLOSE] [NEW ▲] ≫ 405   [VIEW ALL]

GENERAL
CAMPAIGN ID: 4513
CAMAPIGN DESCRIPTION:* TRADESHOW
CAMPAIGN TYPE: DIRECT E-MAIL ▼
START DATE: [17]
END DATE: [30]
STATUS: PLANNED

EXECUTION OPTIONS                                    420
SENDER E-MAIL ADDRESS: RICHARD.WIENER@HPB.COM
REPLY TO E-MAIL ADDRESS: RICHARD.WIENER@HPB.COM
E-MAIL SUBJECT: INVITATION TO TRADE SHOW
E-MAIL TEMPLATE: ALL_PLACEHOLDERS_DEUTSCH.HTML 430
SHOW ADDITIONAL LANGUAGES
EXECUTION STATUS: NOT SCHEDULED

425 — [ADD]

FIG. 4

| CAMPAIGN | OVERVIEW | FEEDS | RESPONSE OPTIONS | EMAIL TEMPLATES | EXECUTION DETAILS |

TRADESHOW

VERSIONS

| LANGUAGE | SUBJECT | TEMPLATE |
|---|---|---|
| ENGLISH | INVITATION TO TRADESHOW | TEMPLATE EN ONE PLACE HOLDER.HTML |
| GERMAN | INVITATION TO TRADESHOW | TEMPLATE DE TWO PLACE HOLDER.HTML |

510 — (above SUBJECT/TEMPLATE headers area)
525 — (ENGLISH row)
520 — (TEMPLATE column)

NAME: TRADESHOW
ID: 4513
TYPE: DIRECT E-MAIL
START DATE: 17-06-2013
END DATE: 30-06-2013
STATUS: ACTIVE
TARGET GROUP: WIENER, BROWN, ETC.
TARGET GROUP STATUS: ACTIVE
TOTAL MEMBERS: 200
CREATED ON: 30.05.2013

PREVIEWING EMAIL TEMPLATES IN MARKETING CAMPAIGNS

FIELD

This application relates generally to campaign management and more specifically to previewing email templates assigned to a marketing campaign.

BACKGROUND

Emails are sent out by enterprises for several purposes such as notification, acknowledgement, authorization, etc. Some enterprises market their products, services and offers to a large number of customers through various modes of marketing campaigns such as email campaign, mail campaign, phone campaign, short message service (SMS) campaign, etc. In many instances, the marketing email is created using an email template personalized for individual recipients. For example, certain dynamic portions of the email template are replaced with attributes personal to the recipient. Oftentimes, it may be prudent to preview the email template to ensure that the content of the email is accurate and relevant to the current campaign. However, the content of the email template rendered in the preview may include certain information in a markup language which is unfamiliar to the user.

SUMMARY

Various embodiments of systems and methods for customizing a preview of the email templates assigned to marketing campaigns are described herein. In an aspect, the method involves receiving a request to preview an email template. In response to the request, a content of the email template including placeholders is invoked. The invoked email content is then parsed to identify HyperText markup language (HTML) elements for the placeholders. Further, the method involves deriving descriptive names for the identified HTML elements according to a correspondence language of the user. In an aspect, the correspondence language of the user is determined based on the user's language selection at the time of login. In an aspect, the identified HTML elements in the email template are replaced with the derived descriptive names and the preview content is rendered on an output interface.

These and other benefits and features of embodiments-will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for customizing a preview of the email templates assigned to marketing campaigns are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment", "one aspect" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Software as a service (SaaS) sometimes referred to as "on-demand software" is a software delivery model in which software and associated data are centrally hosted on the cloud. SaaS is typically accessed by users using a thin client via a web browser. SaaS has become a common delivery model for many business applications, including accounting, collaboration, customer relationship management (CRM), management information systems (MIS), enterprise resource planning (ERP), etc. SaaS applications are hosted centrally where software and data are stored on host servers. The applications can be run on a PC with an internet connection and a web browser. One such SaaS offering is SAP@ Business ByDesign™ from SAP AG.

The SAP® Business ByDesign™ solution offers several modules designed to track end-to-end business processes. Customer relationship management (CRM) is one such module designed to support processes that span marketing, sales and service activities. Marketing includes a variety of activities such as creating and running marketing campaigns across multiple channels, connecting with target customers, generating leads, etc. One of the marketing functions supported by SAP CRM module is Campaign Management to execute marketing campaign processes including design, execution, coordination, optimization, and monitoring. A marketing campaign would typically send a message to several hundreds of recipients referred to as bulk messaging. Bulk messaging is dissemination of large number of messages to people across the globe. Typically, in such message campaigns, bulk messaging is processed in batches referred to as batch processing. Batch processing is execution of series of programs or jobs on a processing unit without manual intervention.

Release Feature Pack (FP) 4.0 of SAP® Business ByDesign™ solution provides for the use of email templates for generating emails for campaigns. The email templates have a pre-defined text as well as placeholders for receiving personal data pertaining to a recipient. The placeholders in the template allow for the personalization of the email sent to the target recipients of the campaign. In an aspect, the email templates are created at an external source ($3^{rd}$ party) using state-of-the-art tools as a file and uploaded into the CRM system. The content of the email is personalized by simply adding personal data relating to the recipient in place of the placeholders. In certain scenarios, prior sending out the email to thousands of recipients, a user may want to ensure that the content of the email is accurate and relevant to the current campaign. Accordingly, the user may request for a preview of the email template before sending the email template out as a personalized email. However, since the email template is embodied as an HTML text, the email template preview may display the placeholders as HTML elements which may be difficult for the user to interpret and understand. One or more embodiments described herein provide for replacing the HTML elements in the email template with descriptive names, in the language of correspondence of the user, for the preview. The example embodiments illustrated below using FIG. 1 to FIG. 8, describe in detail the customizing of email template previews in marketing campaigns.

Figure 1:
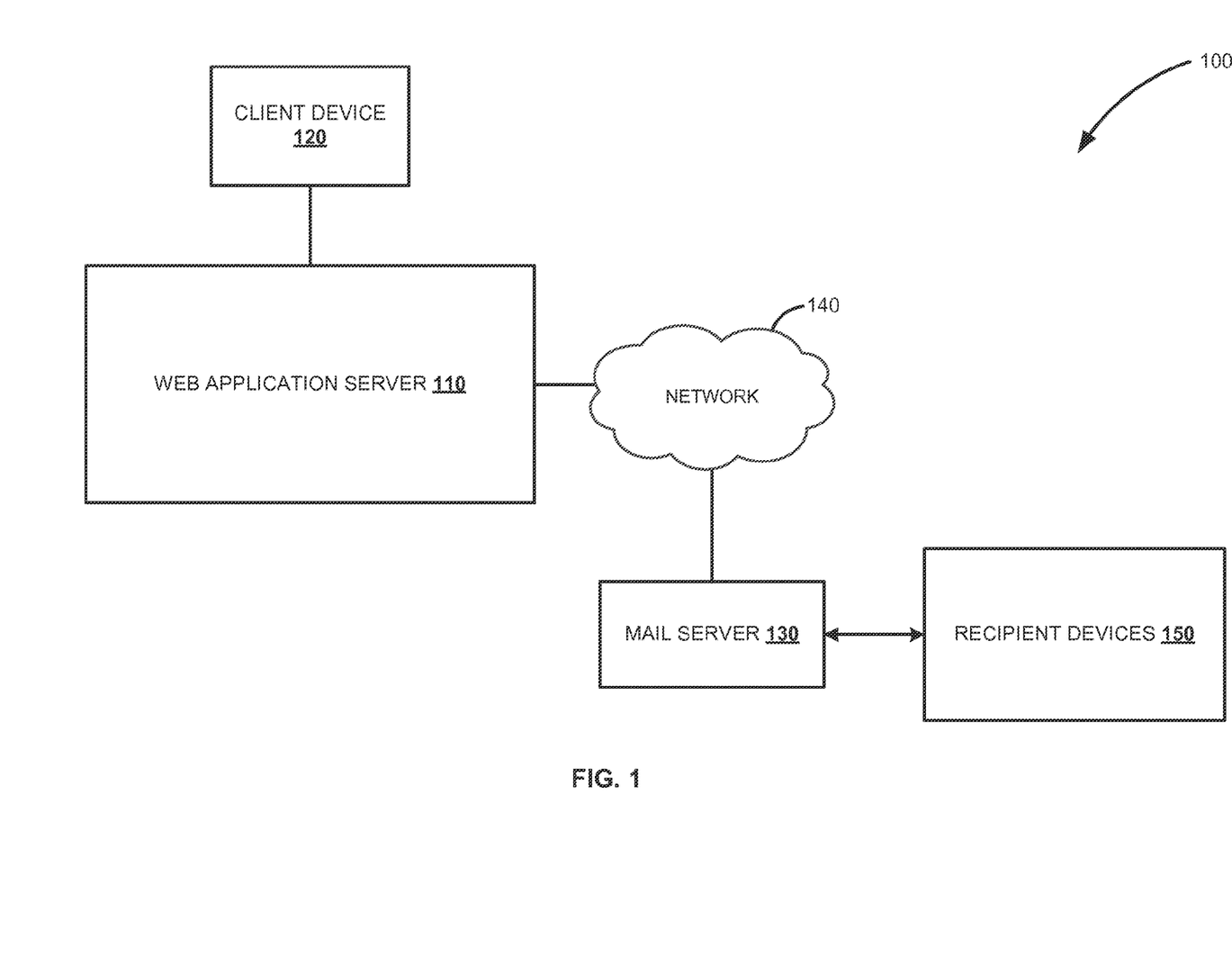
FIG. 1 is a block diagram illustrating an exemplary environment for executing a marketing campaign, according to one embodiment.

FIG. 1 is a block diagram illustrating an exemplary environment for previewing e-document templates, according to one embodiment. The term "e-document" as used herein refers to an electronic document that can be edited, formatted, and/or composed using a word processing application. In an embodiment, the e-document template is an email template used in generating emails for a marketing campaign. Environment 100 depicts an example configuration of a system for executing a marketing campaign in a cloud computing environment, such as environment 100. The environment 100 includes a web application server 110 hosting a campaign management application, client device 120, a mail server 130 communicatively coupled to the mail server via network 140, and recipient devices 150. The client device 120 may include a processor, an interface, a networked application or application interface, a graphical user interface (GUI), and a memory. In general, the client device 120 may comprise one or more electronic computer devices operable to receive, transmit, process, and store any appropriate data associated with the environment 100 of FIG. 1. The networked application or application interface can enable the client device 120 to access and interact with applications and modules in the web application server 110 using a common or similar platform. It will be understood that there may be a number of client devices associated with, or external to, environment 100. For example, while illustrated environment 100 includes one client device 120, alternative implementations of environment 100 may include multiple client devices communicably coupled to the web application server 110.

In some embodiments, one or more client devices may be associated with administrators of the environment, and may be capable of accessing and interacting with the settings and operations of one or more business applications, and/or other components of the illustrated environment 100. Additionally, there may also be one or more additional client devices external to the illustrated portion of environment 100 capable of interacting with the environment 100 via network 140. Further, the terms "user," "client," and "personnel" may be used interchangeably as appropriate and refer to a person or entity. Moreover, while the client device 120 is described in terms of being used by a single user, this disclosure contemplates that many users may use one computer, or that one user may use multiple computers. For example, several employees of a company, called users, can use the applications deployed on the corresponding client device. For instance, the term "client device" refers to a system providing a set of business applications belonging to or rented by a particular customer or business entity. Several employees of that particular customer or business entity can be users of that client device and use the business applications provided by or available on this client device.

The environment 100 is an example and, in alternative implementations, the elements illustrated in FIG. 1 may be included in or associated with different and/or additional servers, clients, networks, and locations other than those as shown. For example, one or more of the components within the web application server 110 may be located in multiple or different servers, cloud-based or cloud computing networks, or other locations accessible to the web application server 110 (e.g., either directly or indirectly via network 140). The client device 120 can access certain business applications built upon a similar, or common, on-demand platform. For example, the client device 120 may request certain data or data objects of a business application running on the web application server 110.

In an embodiment, a user logs into the campaign management application from the client device 120, and creates a new marketing campaign for sending personalized emails to the members of an assigned target group. The creation of a new marketing campaign is part of a campaign definition phase in which an email template (an HTML email form) for generating the personalized emails is uploaded and assigned to the marketing campaign being created. In an aspect, the template may be created external to the environment 100 by $3^{rd}$ party tools. The externally created email template is then uploaded into the campaign management application and maybe stored in a local file. Email templates are the basis on which e-mails, letters, electronic messages like SMS, and faxes are generated and sent to the members of the target group. The content of the email template can be personalized by adding personal data relating to the customer into designated placeholders in the template.

At certain moments such as prior to executing the campaign, i.e., prior to sending out the email template as a personalized email to members of the target group, the user may want to preview a particular email template. The user may request a template for a preview by e.g., selecting a Uniform Resource Indicator (URI) for the email template on a user interface (UI). In an embodiment, the email body of the email template contains placeholders in a certain HTML syntax, as shown in Example 1, Example 1

```
<span class="variable">
/ FormCampaignExecutionPlaceholder/Account/FormattedName
</span>
```

In example 1, the placeholder named "FormCampaignExecutionPlaceholder/Account/FormattedName" is part of a SPAN-tag which is assigned a class having a value "variable." Since the email template is in an HTML form, the preview is provided in a web browser on the UI of the client device. However, the preview functionality in the application server uses an Internet Communication Framework (ICF) service of the web application server and a corresponding HTTP handler class. The ICF service and the handler class simply wrap the preview content into a HTTP response. At this point, the preview content is merely a binary string which has been put into a buffer using class "CL_TT_PREVIEW_CONTEXT". The preview content at this point will include HTML elements for placeholders rendered in an HTML syntax as shown in Example 2.

Example 2

"Dear, /FormCampaignErecutionPlaceholder/Customer/ AdditionalNameOrLastName, you are invited to . . . . "
As given in Example 2, the HTML element "Customer/AdditionalNameOrLastName" is prefixed with a semantic name "FormCampaignExecutionPlaceholder."

In order to provide a preview that is "user-friendly," i.e., easy to interpret and understand by the user, one or more embodiments described herein provide for replacing the HTML placeholder elements with descriptive names which are in simple and plain text. Example 3 shows the preview content after replacing HTML placeholder elements in the preview content shown in Example 2.

Example 3

"Dear, <Customer's additional name or last name>, you are invited to . . . . "
As given in Example 3, the HTML element and the semantic name for the placeholder in Example 2 is replaced with descriptive name "Customer's additional name or last name."

In an embodiment, the preview content is customized according to a preferred language of correspondence to the user. The customization involves, identifying the HTML placeholder elements in the preview content, deriving the associated descriptive names for the elements in the preferred language of the user, and replacing the HTML placeholder elements with the derived descriptive names. The customized preview content is then rendered as a preview to the user on the client device 120. In an aspect, an application developer may implement a new Form Message type for placeholders e.g., "APCRM_FORM_CPG_EXE_PLACEHOLDER" having semantic name e.g., "FormCampaignExecutionPlaceholder." In the new Form Message type, the supported placeholders are added as HTML elements. Each element is assigned a 'descriptive name' which is a language dependent description of the placeholder. The term "descriptive name" as used herein refers to a UI text which is a description of the attribute for which the placeholder holds the place. The descriptive name is devoid of HTML semantic name, HTML element, and HTML syntax. In an aspect the descriptive name is rendered within "<" and ">" in the customized preview content.

In an aspect, the request for preview is provided as a standard HTTP request. In an example, the user interface calls a certain ICF service of the web application server by addressing it via a URL. In response to receiving the request for preview, the campaign management application creates an instance of class "CL_TT_HTML_MERGE". A constructor of this class invokes the email template as Extensible Hyper-Text Markup Language (XHTML) string. This string comprises the email body including the placeholders. The constructor of class "CL_TT_HTML_MERGE" parses the XHTML string into an Extensible markup language (XML) document object model (DOM) tree. Using the XML DOM tree, the class "CL_TT_HTML_MERGE" identifies the HTML placeholder elements within the XHTML string. Subsequently, the application calls method "REPLACE_WITH_DESCRIPTIVE_NAMES" which determines the UI texts i.e., the descriptive names for the identified HTML elements. The identified HTML placeholder elements are then replaced with the corresponding descriptive names and the customized preview content is placed in a context buffer as an XHTML string. The preview handler (class "CL_TT_PREVIEW_HANDLER") which handles the request retrieves the customized preview content from the content buffer and provides the preview as a HTTP response to the request. The customized preview is displayed in a new browser window.

Figure 2:
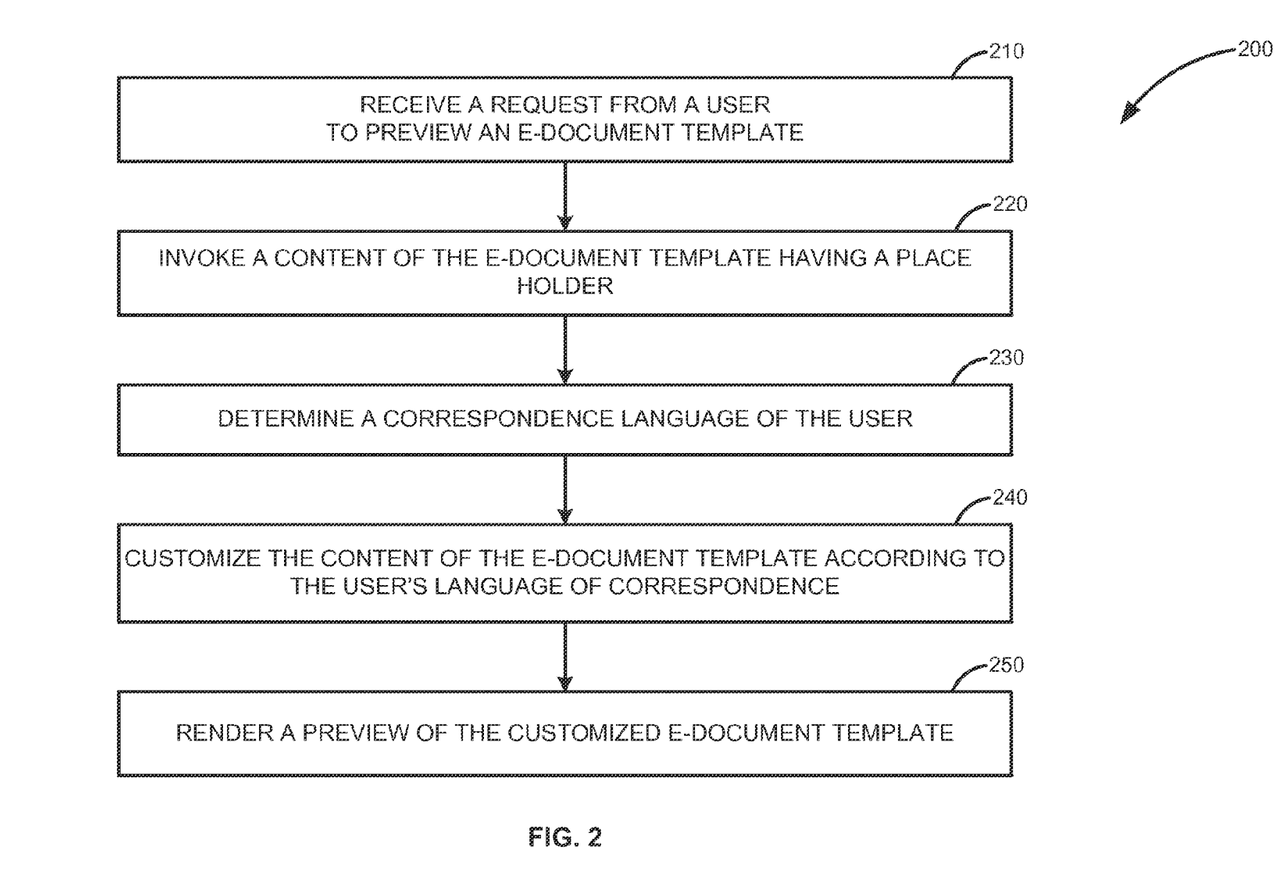
FIG. 2 is a flow diagram of a method for previewing email templates assigned to a marketing campaign, according to one embodiment.

FIG. 2 illustrates a flow diagram of process 200 for previewing e-document templates. Portions of process 200, as shown in FIG. 2, are performed at a system (e.g., system 100) having one or more processors and a memory, which stores one or more instructions to be executed by the one or more processors of the system 100. The process 200 involves receiving a request to preview a content of an e-document template such as an email template at process step 210. In an aspect, the email template includes placeholders for attributes specific to each of the recipients of a target group. The term "recipients" as used herein refers to either an account such as an organization, a contact person for an organization, or an individual having an email address, fax or phone number. In an aspect, the recipients are classified into different target groups on the basis of certain shared marketing attributes such as age, occupation, hobbies, income, gender, etc. Within the campaign management application, the target groups are assigned to a marketing activity, such that, when the activity is executed, the list of recipients in the target group is forwarded to the campaign application for further processing. Upon executing the campaign, a personalized email based on the email template is sent to each of the recipients by replacing the placeholders with personal information relating to the recipient. The term "personalized email" as used herein refers to an email which is customized or tailored for a particular recipient by including personal information pertaining to the recipient in the email body. Examples of personal information include, name, title, designation, identification number, reference number, etc.

Upon receiving the request for previewing a particular email template, a content of the email template is invoked as an XHTML string at process block 220. The string comprises the email body including the placeholders. Further, at process block 230, a correspondence language of the user is determined. In an aspect, the correspondence language of the user is determined from the user's account settings. In another aspect, the correspondence language of the user is determined from the language preference selected by the user at the time of logging into the application. For example, at the time of login, the user may provide his/her login name/ID, password and a language of correspondence, e.g., German. At process block 240, the preview content is customized according to the user's language setting and rendered on an output interface, at process block 250. The method 300 of customizing the preview content is described with reference to FIG. 3.

Figure 3:
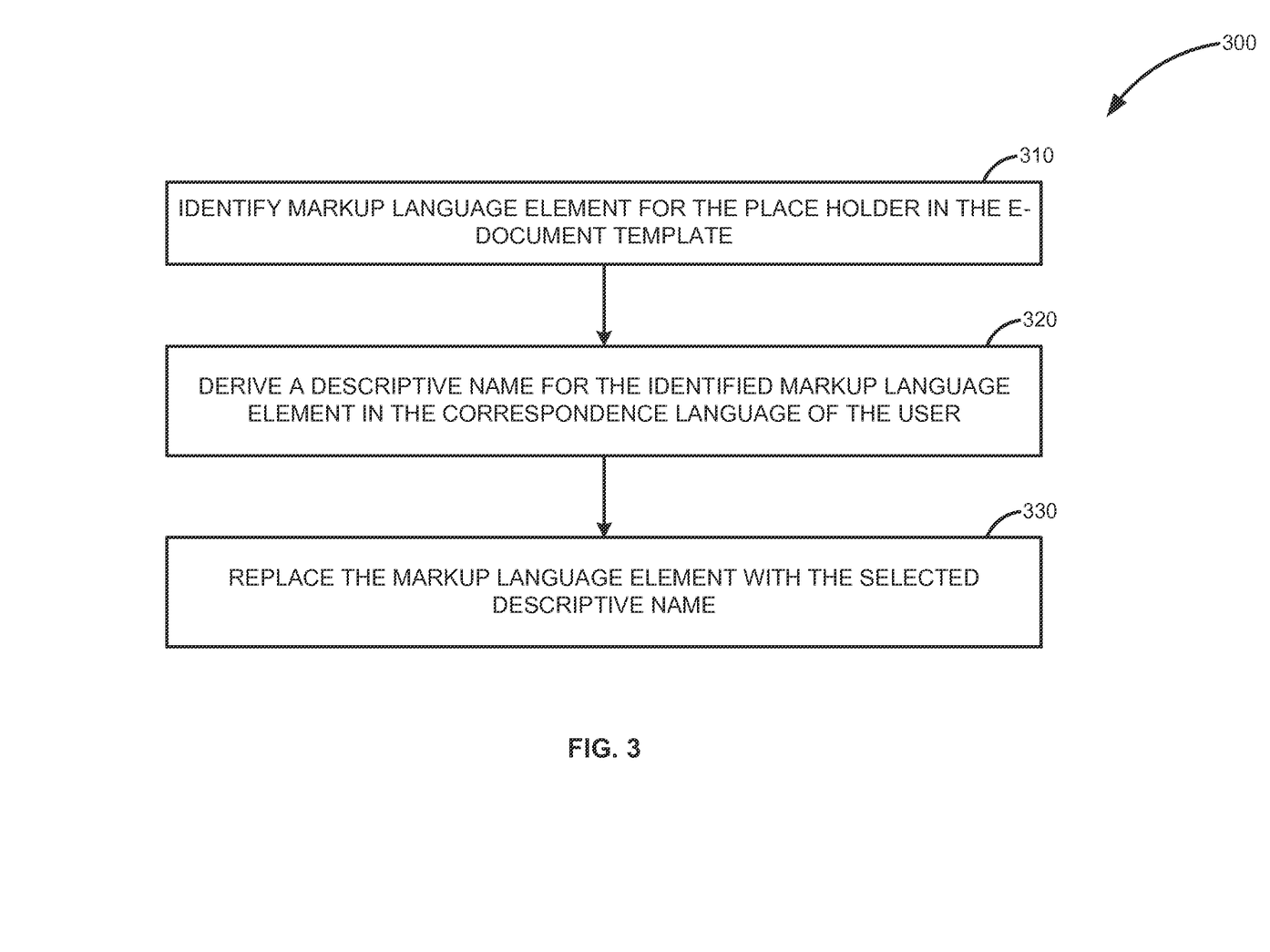
FIG. 3 is a flow diagram of a method for customizing a preview content of an email template assigned to a marketing campaign, according to one embodiment.

As shown in FIG. 3, at process block 310, the application identifies the HTML elements for the placeholders in the email template by creating an instance of class CL_TT_HTML_MERGE. The constructor of class CL_TT_HTML_MERGE invokes the email template as an XHTML string and parses the XHTML string into a XML data object model tree and identifies the HTML placeholder elements within the XHTML string from the DOM tree. Further, at process block 320, the equivalent descriptive names for the identified HTML elements are derived from metadata information of the Form Message Type. As shown in the examples in TABLE 1, the descriptive names provide a user friendly description of the placeholder elements.

TABLE 1

| ELEMENT | DESCRIPTIVE NAME |
| --- | --- |
| CUSTOMER UUID | UUID of corporate account or private account |
| CUSTOMER- INTERNAL_ID | Internal ID of corporate account or private account |
| CUSTOMER- NAME_1 | Name of corporate account or First Name of private account |
| CUSTOMER- NAME_2 | Additional Name of corporate account or Last Name of private account |
| CUSTOMER- FORMATTED_NAME | Formatted Name of corporate account |
| CUSTOMER- FORM_OF_ADDRESS_NAME | Name of title key of private account |
| CUSTOMER- ACADEMIC_TITLE_NAME | Name of academic title key of private account |
| CONTACT_PERSON- UUID | UUID of contact person |
| CONTACT_PERSON- INTERNAL_ID | Internal ID of contact person |
| CONTACT_PERSON- FIRST_NAME | First Name of contact person |
| CONTACT_PERSON- LAST_NAME | Last Name of contact person |
| CONTACT_PERSON- FORMATTED_NAME | Formatted Name of contact person |
| CONTACT_PERSON- FORM_OF_ADDRESS_NAME | Name of title key of contact person |
| CONTACT_PERSON- ACADEMIC_TITLE_NAME | Name of academic title key of contact person |
| CONTACT_PERSON- BUSINESS_CARD_FUNCTION_NAME | Name of function of contact person |
| CONTACT_PERSON- BUSINESS_CARD_DEPARTMENT_NAME | Name of department of contact person |
| RESPONSE_CODE_ID | ID or personal response code |
| MAILING_PERMISSION_DENY_MAILTO | URI for unsubscribe |

Further, in an aspect, the descriptive name is derived according to the correspondence language of the user such that the descriptive name is rendered in the language of correspondence of the user. At process block 330, the identified HTML placeholder elements are replaced with the derived descriptive names. In an example, a user having a language preference for 'German' may request for a preview of an email template expressed in English language. Typically, a preview of the email template will return the preview content including the HTML placeholder elements in English language. However, according to the embodiments disclosed herein, the customized preview content not only has the HTML placeholder elements replaced by descriptive names, but has the descriptive names expressed in German language according to the user's language of preference.

Referring back to FIG. 2, the preview content which is customized according to the method 300 is rendered on a UI of the client device 120. In an aspect, the preview is displayed in a new browser window on the UI.

Figure 4:
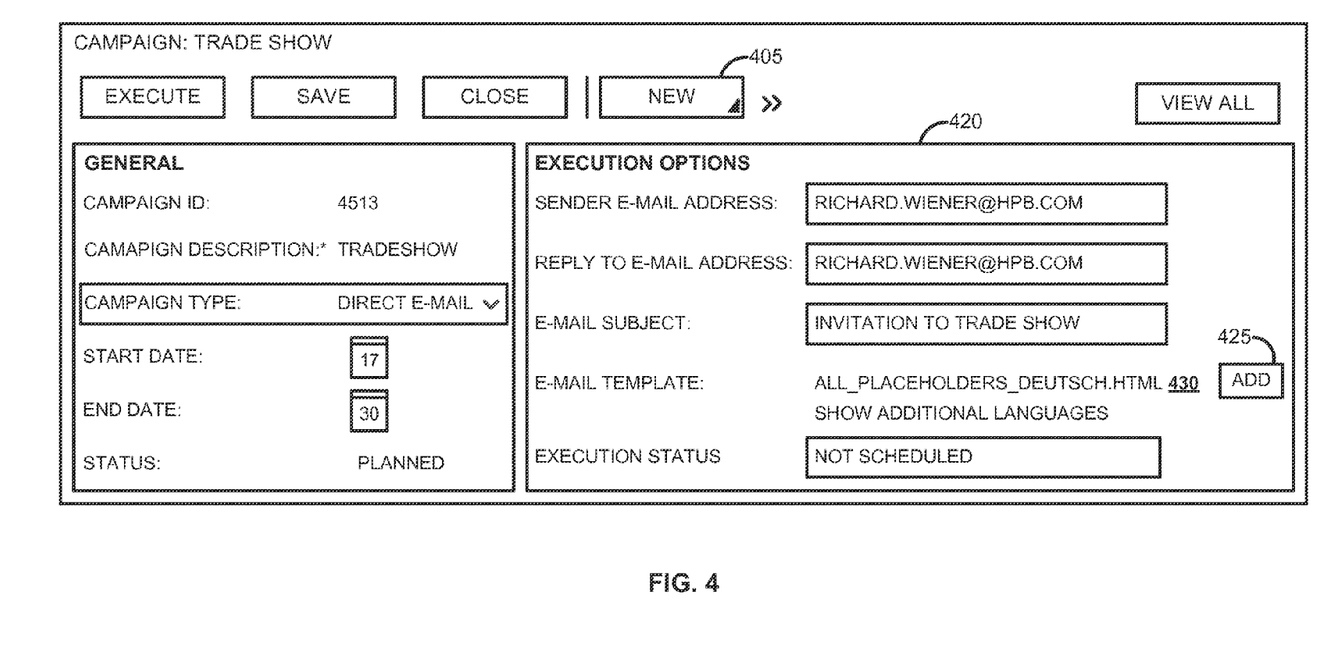
FIG. 4 illustrates a graphical representation of a web user interface (UI) for creating an email campaign, according to one embodiment.

FIG. 4 illustrates a graphical representation of a web user interface (UI) for creating a bulk marketing campaign, in accordance with an embodiment. In an example campaign scenario, an invitation for an annual trade show is purported to be sent by an e-mail to a pre-defined group of recipients. In order to facilitate personalized communication with business partners on a mass scale, email templates are used in conjunction with marketing campaigns. The email template includes placeholders for receiving personal information (Attributes) pertaining to a particular recipient. The response received for this invitation may form the basis of a second wave of campaign. For example, those that respond may receive a thank you email whereas non-responders may receive a reminder after a week. The layout and content of an email template can be adapted according to the communication channel (email, letter, fax, and SMS) selected.

Referring to the example in FIG. 4, selecting the tab "New" 405 to create a new campaign, renders a layout 410 having input fields namely campaign ID, campaign description campaign type, start date, end date, etc. Selecting the campaign type as "Direct e-mail" generates a modal window 420 on the UI. Some of the fields provided in the modal window 420 include: sender email address, reply-to e-mail address, e-mail subject, e-mail template, and execution status. The corresponding input fields for these options can be populated with data according to the campaign being created.

An e-mail template for the campaign may be uploaded from a local file by selecting the "Add" option 425. Selecting the "Add" option 425 opens a file selector pop-up (not shown) of the client device's operating system. During the upload an API of the campaign management application is called which checks the HTML syntax of the email template and converts the data stream into Extensible HyperText markup language (XHTML). The content of the uploaded HTML file will be stored as XHTML in the node MAIL_FORM of BO Campaign. In an aspect, the user manually enters the subject line for the uploaded email template and sets a language code of the uploaded email template. When the email template is uploaded, the description of the email template is displayed as hyperlink 430. Selecting this hyperlink 430 opens a browser window and allows for preview of the email template.

Figure 5:
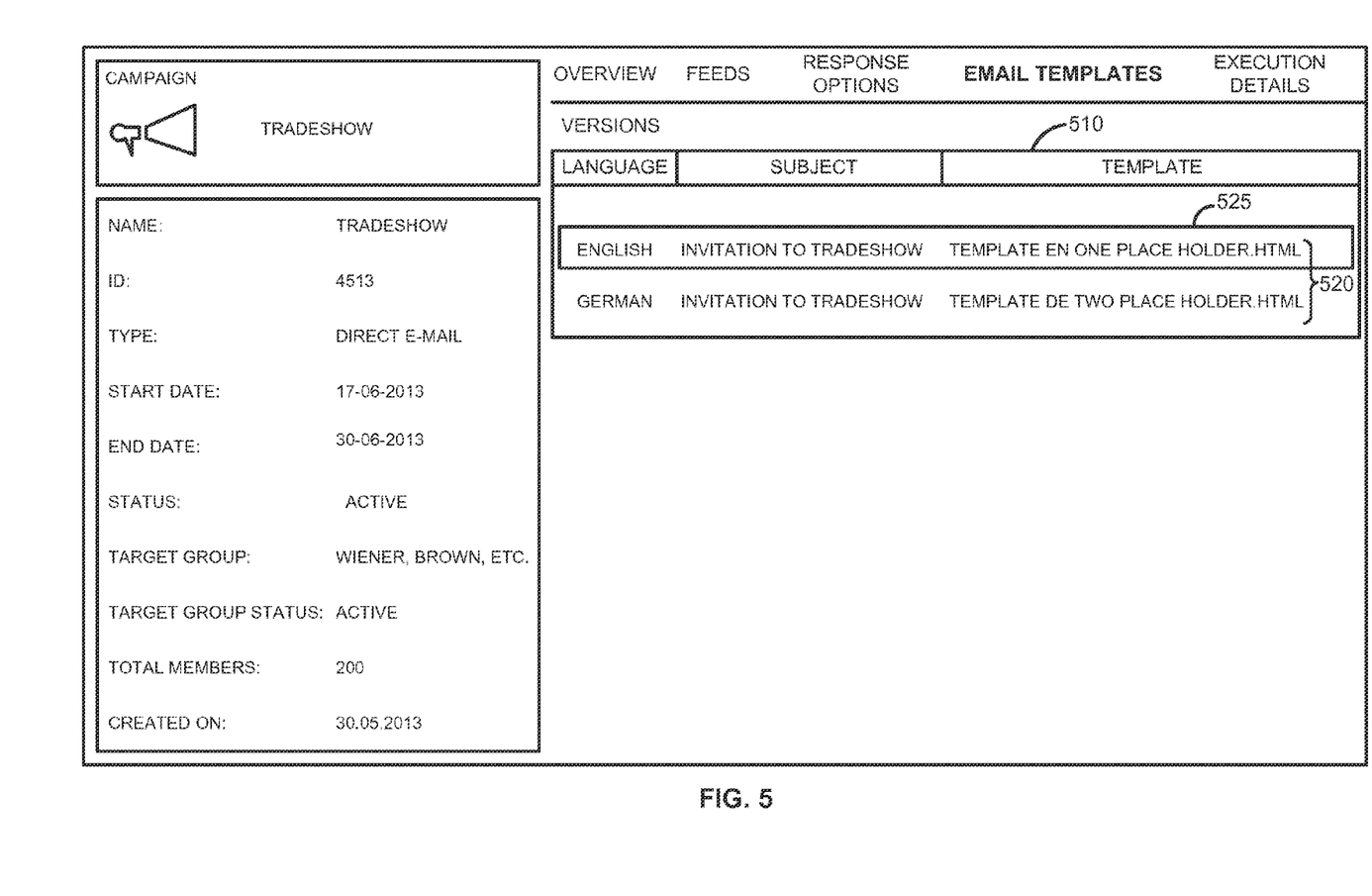
FIG. 5 illustrates a graphical representation of a web user interface (UI) showing a list of email templates assigned to a marketing campaign, in accordance with an embodiment.
Figure 6:
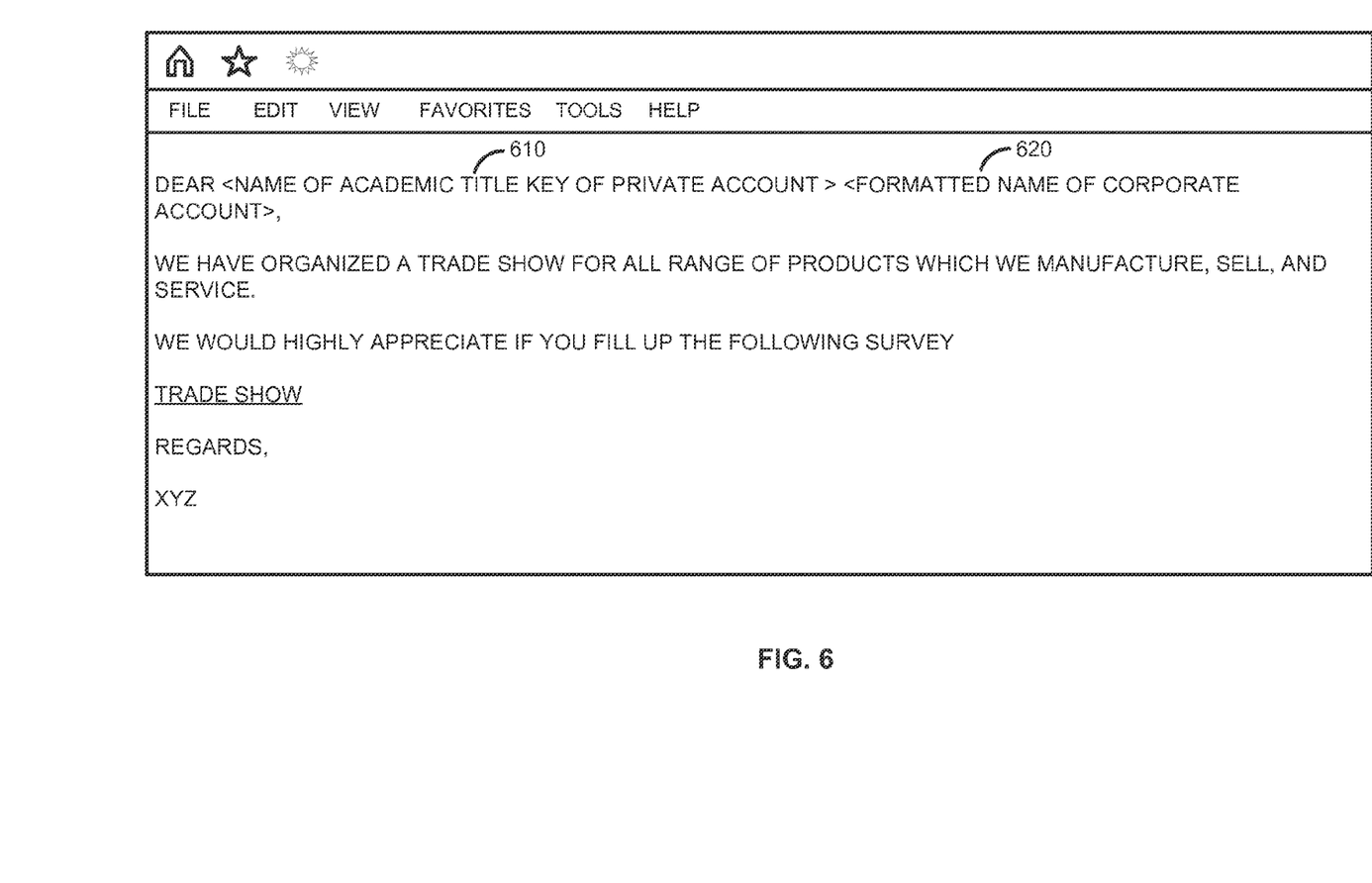
FIG. 6 illustrates a graphical representation of a web browser interface showing an email template preview, in accordance with an embodiment.
Figure 7:
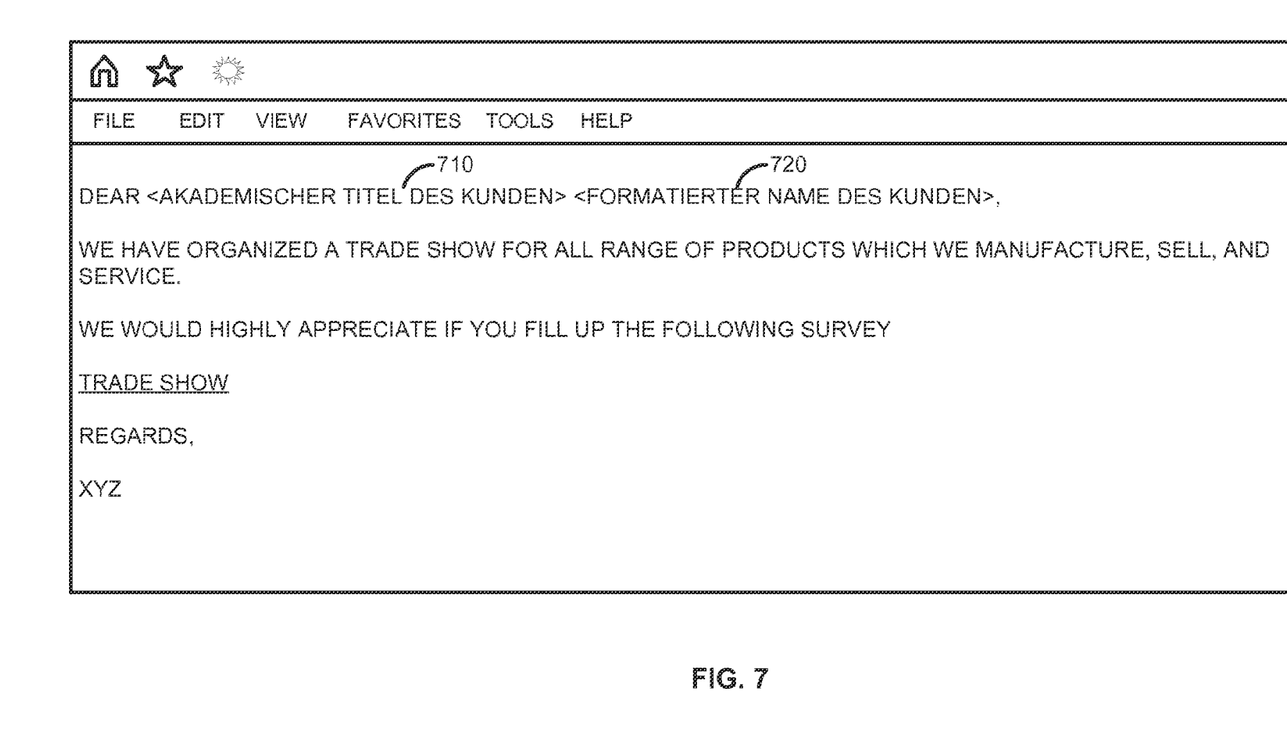
FIG. 7 illustrates a graphical representation of a web browser interface showing an email template preview, in accordance with another embodiment.

FIG. 5 illustrates a graphical representation of a web user interface (UI) showing a list 510 of email templates that are uploaded and assigned to the campaign "Trade Show." For simplicity, the example in FIG. 5 only lists two email templates in English and German language respectively. A user may request for a preview of one of the listed email templates by selecting a hyperlink 520 to the template. In the given example, a user wanting to preview the email template in language English can simply select the corresponding hyperlink 525. A browser window as shown in FIG. 6 opens and displays the content of the email template with placeholders. The placeholders in the displayed preview are replaced with user friendly descriptive names 610 and 620. As shown in the example in FIG. 6, the HTML placeholder elements "/Form-CampaignExecutionPlaceholder/Customer/Formatted- Name" and "FormCampaignExecutionPlaceholder/Customer/AcademicTitleName" are replaced with user friendly descriptive names "<Formatted Name of corporate account>" 620 and "<Name of academic title key of private account>" 610 respectively. In an example, the user requesting for the preview may have his correspondence language set to "German." In such an instance, when the user requests for a preview of the English language template, the application replaces the HTML placeholder elements with the German descriptive names instead of English descriptive names as shown in the example in FIG. 7. In the example shown in FIG. 7, the German descriptive names "<Akademischer Titel des Kunden>" 710 and "<Formatierter Name des Kunden>" 720 replace the HTML placeholder elements in the preview content instead of the English descriptive names "<Formatted Name of corporate account>" and "<Name of academic title key of private account>."

Some embodiments may include the above-described methods being written as one or more software components. These components, and the functionality associated with each, may be used by client, server, distributed, or peer computer systems. These components may be written in a computer language corresponding to one or more programming languages such as, functional declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
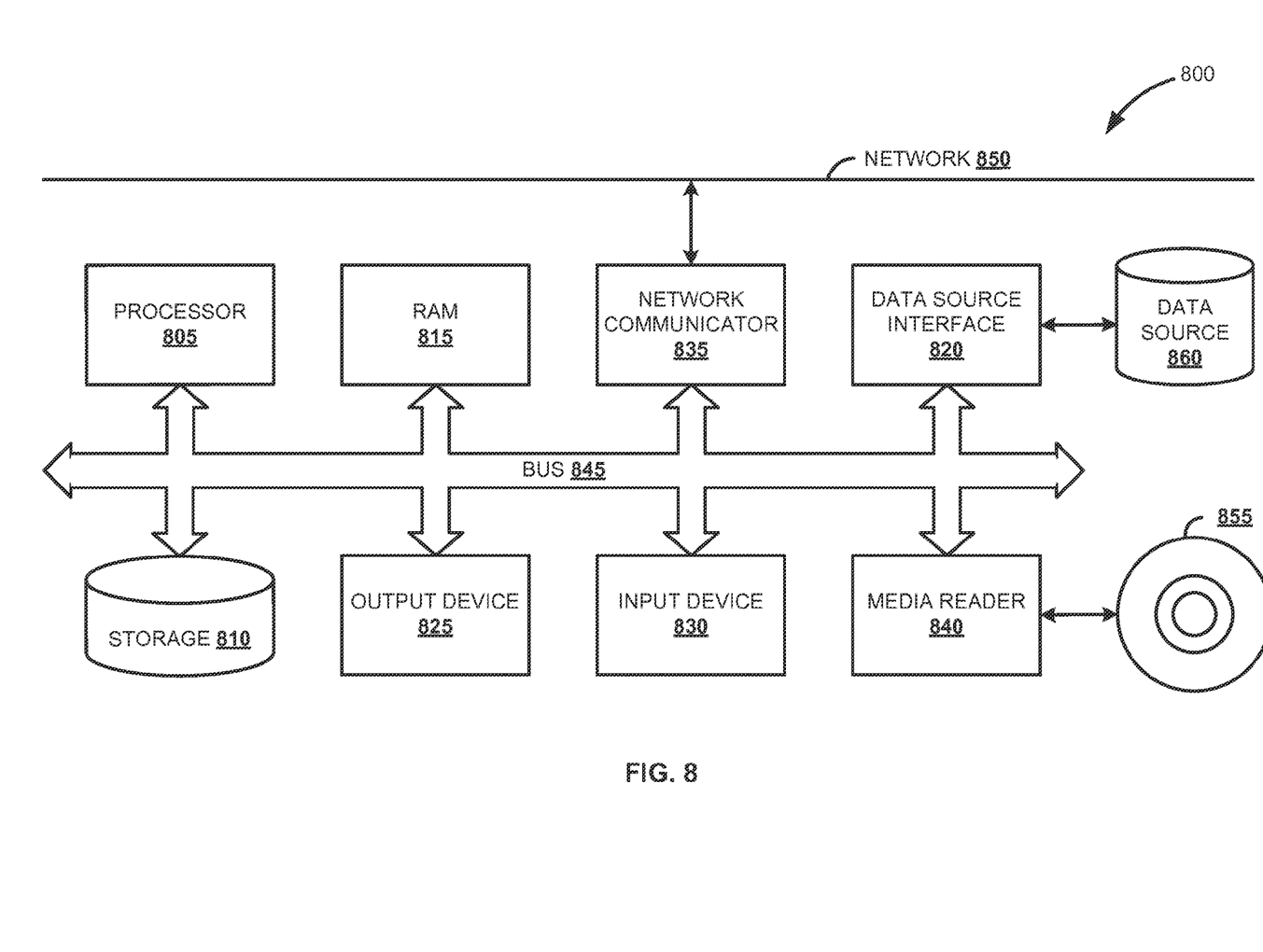
FIG. 8 is a block diagram of an exemplary computer system according to one embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g. ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method for providing a preview of an email template, the method comprising:
   receiving, at a computer, a request from a user of the computer to preview an electronic document (e-document) template;
   invoking a content of the e-document template, wherein the content includes a placeholder for a variable;
   determining, by the computer, a correspondence language of the user;
   identifying, by the computer, a markup language element for the placeholder in the e-document template;
   determining, by the computer, a descriptive name for the identified markup language element by invoking metadata information pertaining to the place holder, and based on the metadata information, deriving the descriptive name associated with the identified markup language element for the placeholder in the correspondence language of the user;
   replacing the markup language element for the placeholder with the selected descriptive name; and
   rendering a preview of the e-document template.

2. The method of claim 1, wherein receiving a request to preview the e-document template comprises receiving a selection of a hyperlink to the e-document template.

3. The method of claim 1, wherein determining the correspondence language of the user comprises determining a language option selected by the user at the time of logging into the application.

4. The method of claim 1, wherein identifying the markup language elements for the placeholders comprises:
   invoking the email template as an Extensible HyperText Markup Language (XHTML) string;
   parsing the XHTML string into an Extensible markup language (XML) document object model (DOM) tree; and
   based on the DOM tree, identifying the markup language elements within the XHTML string.

5. A non-transitory computer readable storage medium having instructions which when executed by a computer causes the computer to:
   receive a request from a user of the computer to preview an e-document template;
   invoke a content of the e-document template, wherein the content includes a placeholder for a variable;
   determine a correspondence language of the user;
   identify, by the computer, a markup language element for the placeholder in the e-document template;
   determine, by the computer, a descriptive name for the identified markup language element by invoking metadata information pertaining to the place holder, and based on the metadata information, deriving the descriptive name associated with the identified markup language element for the placeholder in the correspondence language of the user;
   replacing the markup language element for the placeholder with the selected descriptive name; and
   render a preview of the e-document template.

6. The computer readable storage medium of claim 5, wherein the electronic document template is an email template used in creating a personalized email.

7. The computer readable storage medium of claim 6, wherein the variable comprises a value specific to a recipient of the personalized email.

8. The computer readable storage medium of claim 5, wherein variable includes at least one of name, title, designation, customer ID, social security number, and reference number.

9. The computer readable storage medium of claim 5, wherein the descriptive name is a UI text description of a corresponding placeholder.

10. The computer readable storage medium of claim 5, wherein the markup language element is an HTML element rendered within HTML tags.

11. The computer readable storage medium of claim 10, wherein the HTML tags are Span tags.

12. A system operating in a communication network, comprising:
    a computer comprising a memory to store a program code, and a processor to execute the program code to:
    receive a request from a user of the computer to preview an e-document template;
    invoke a content of the e-document template, wherein the content include a placeholder for a variable;
    determine a correspondence language of the user;
    identify, by the computer, a markup language element for the placeholder in the e-document template;
    determine, by the computer, a descriptive name for the identified markup language element by invoking metadata information pertaining to the place holder, and based on the metadata information, deriving the descriptive name associated with the identified markup language element for the placeholder in the correspondence language of the user;
    replace the markup language element for the placeholder with the selected descriptive name; and
    render a preview of the e-document template.

13. The system of claim 12, wherein the electronic document template is an email template used in creating a personalized email.

14. The system of claim 13, wherein the variable comprises a value specific to a recipient of the personalized email.

15. The system of claim 12, wherein the descriptive name is a UI text description of a corresponding placeholder.

16. The system of claim 12, wherein the variable includes at least one of name, title, designation, customer ID, social security number, and reference number.

17. The system of claim 12, wherein the markup language element is an HTML element for the placeholder rendered within HTML tags.

18. The system of claim 17, wherein the HTML tags are Span tags.

* * * * *